(12) United States Patent
Girsberger et al.

(10) Patent No.: US 6,334,648 B1
(45) Date of Patent: Jan. 1, 2002

(54) VEHICLE SEAT

(75) Inventors: Jürg Girsberger, Oberwil-Nürnsdorf; Christian Hegner, Esslingen, both of (CH)

(73) Assignee: Girsberger Holding AG, Butzberg (CH)

( * ) Notice: Subject to any disclaimer, the term of this patent is extended or adjusted under 35 U.S.C. 154(b) by 0 days.

(21) Appl. No.: 09/636,671

(22) Filed: Aug. 11, 2000

Related U.S. Application Data

(63) Continuation of application No. 09/146,152, filed on Sep. 3, 1998, now abandoned, which is a continuation-in-part of application No. 09/044,412, filed on Mar. 19, 1998, now abandoned.

(30) Foreign Application Priority Data

Mar. 21, 1997 (DE) .......................................... 197 11 944

(51) Int. Cl.$^7$ ................................................. B60N 2/42
(52) U.S. Cl. .................................. 297/216.19; 297/322
(58) Field of Search ........................ 297/216.1, 216.13, 297/216.14, 216.15, 216.16, 216.17, 216.18, 216.19, 216.2, 320, 322

(56) References Cited

U.S. PATENT DOCUMENTS

| | | | |
|---|---|---|---|
| 2,102,979 A | | 12/1937 | Smith |
| 2,599,079 A | * | 6/1952 | Tatom .................... 297/320 X |
| 2,922,461 A | | 1/1960 | Braun ................... 297/216.15 |
| 3,145,051 A | | 8/1964 | Rausch |
| 3,357,736 A | | 12/1967 | McCarthy |
| 3,802,737 A | | 4/1974 | Mertens |
| 3,998,291 A | | 12/1976 | Davis |
| 4,154,472 A | | 5/1979 | Bryll |
| 4,512,604 A | | 4/1985 | Maeda et al. |
| 4,732,424 A | * | 3/1988 | Uredat-Neuhoff ....... 297/320 X |
| 4,738,485 A | | 4/1988 | Rumpf |
| 4,861,106 A | | 8/1989 | Sondergeld |
| RE34,354 E | | 8/1993 | Sondergeld |
| 5,244,252 A | | 9/1993 | Serber |
| 5,366,269 A | | 11/1994 | Beauvais |
| 5,437,494 A | | 8/1995 | Beauvais |

(List continued on next page.)

FOREIGN PATENT DOCUMENTS

| | | |
|---|---|---|
| DE | 2 112 443 | 9/1971 |
| DE | 1 780 008 | 3/1972 |
| DE | 2 216 378 | 10/1973 |
| DE | 19 06 813 B 2 | 10/1978 |
| FR | 2 224 322 A | 10/1974 |
| JP | 56-155650 | 11/1981 |
| JP | 60-34259 | 3/1985 |
| JP | 63-125456 | 5/1988 |
| JP | 3-29043 | 3/1991 |
| JP | 7-05899 | 1/1995 |
| JP | 10-53056 A | 2/1998 |
| WO | WO 97/10117 | 3/1997 |

*Primary Examiner*—Peter R. Brown
(74) *Attorney, Agent, or Firm*—Akin, Gump, Strauss, Hauer & Feld, L.L.P.

(57) ABSTRACT

A vehicle seat (1) has a carrier part (8) connected to a seat back (2), preferably with an integrated headrest (3), and a seat part (4) having a sitting surface. The seat back (2) is movable from a predetermined starting position to a safety position during a crash-related introduction of forces through the user of the seat during a rear collision. For this purpose, the carrier part has a support for the seat back (2) arranged above the sitting surface and spaced with an effective lever arm from the position for the introduction of forces by the pelvis area against in the seat back (2). The seat part (4) is connected to a guide slanting upwardly and forwardly away from the seat back (2), so that during a frontal collision, the seat part is moved from the originally selected starting position into a position of greater safety. The vehicle seat (1) according to the invention offers the user both good ergonomics and at the same time the greatest possible degree of safety.

21 Claims, 3 Drawing Sheets

U.S. PATENT DOCUMENTS

| | | |
|---|---|---|
| 5,449,218 A | 9/1995 | Beauvais et al. |
| 5,460,427 A | 10/1995 | Serber |
| 5,490,706 A | 2/1996 | Totani |
| 5,558,399 A | 9/1996 | Serber |
| 5,636,424 A | 6/1997 | Singer et al. |
| 5,788,185 A | 8/1998 | Hooper |

* cited by examiner

VEHICLE SEAT

CROSS-REFERENCE TO RELATED APPLICATION

This application is a continuation of U.S. application Ser. No. 09/146,152, filed Sep. 3, 1998, now abandoned, which in turn is a continuation-in-part of U.S. application Ser. No. 09/044,412, filed Mar. 19, 1998, now abandoned.

BACKGROUND OF THE INVENTION

The invention involves a vehicle seat which has a carrier part connected to a seat back, preferably with an integrated headrest, and a seat part having a sitting surface. Vehicle seats of this type are already known in the most diverse forms. For some of these previously known vehicle seats the seat back as well as the seat part can be adjusted, so that the user of this vehicle seat can individually set and adapt the sitting position to be as comfortable as possible, particularly for long drives.

Vehicle seats of this type are, for example, also built into subcompacts which are enjoying increasing popularity. Particularly since subcompacts of this type have a comparably short crumple zone in frontal or rear collisions, extensive safety concepts are being developed for lightweight vehicles of this type, which offer the vehicle passengers as large a degree of safety as possible in case of an accident, and should be effective against serious personal injuries.

In the context of these extensive safety concepts, the vehicle seat also has a decisive significance. In general, vehicle seats having headrests are recommended which should support the user in the cervical vertebra area during a rear collision. A headrest has already been developed, which is catapulted to the front in the direction of the head during a rear collision, in order to catch the head at an early point in time.

SUMMARY OF THE INVENTION

From this an object arises, in particular, of creating a vehicle seat of the type described at the outset, which not only offers the user the highest possible degree of comfort, but also the largest possible degree of safety in crash situations.

According to one aspect of the invention, the seat back is connected to a carrier part in such a manner that the seat back is movable during a rear collision by a crash-related introduction of force through a user of the vehicle seat from a predetermined starting position to a safety position, and the carrier part has a support for the seat back, which support is arranged above the sitting surface of the seat part and is spaced by an effective lever arm from a position for introduction of forces by a pelvis area of the user against the seat back during the rear collision.

By means of this aspect of the invention, it is achieved that for a rear collision, the suspension of the back shell or the seat back, arranged relatively high above and set off at a distance by an effective lever arm from the crash-related position for the introduction of forces by the pelvis, chest, neck, and head area, brings about a generally improved moment distribution, and associated with that, a sequentially more favorable movement progression of the seat back.

According to another aspect of the invention, the seat part is connected to the carrier part in such a manner that the seat part is movable during a frontal collision by a crash-related introduction of force through the user of the vehicle seat from a predetermined starting position to a safety position, and the seat part is connected to a guide oriented on a slant upwardly and forwardly away from the seat back.

During a frontal collision, an acceleration force directed towards the front acts on the body of the user and also exercises a moment of force directed to the front on the seat part via the pelvis of the user. With this second aspect of the invention, this moment of force moves the seat part forwardly and upwardly in its restrictive guide and a retaining device between the seat and carrier part correspondingly yields. By this movement of the seat part from the originally selected starting position to the relatively higher safety position and the consequently changed sitting position of the user, the stresses on the pelvis are reduced and a submerging of the user under the seatbelt, the so-called submarining, is prevented.

It is especially advantageous if the seat back and the seat part are preferably hinged to each other at their ends which face each other, if the carrier part has connection positions for the seat back and the seat part, which are constructed in particular respectively by sliding or restrictive guides in which the seat back and the seat part are movably conducted and can be fixed in different adjustment positions using a retaining device, and if the retaining device which is effective between the seat and the carrier part for a fixed sitting position is especially yielding in an energy-absorbent manner for the movement of the seat from a predetermined starting position to a safety position during a crash-related introduction of forces.

The seat back and the seat part are thus each guided in the restrictive guides of the carrier part, which function as a seat carrier. While the joint area provided between the seat part and the seat back is arranged to be free floating, the seat back and the connected seat part can be brought by the user in their restrictive guides into an individually preferred adjustment position and fixed therein preferably in a continuous manner.

In this process, the selected adjustment position is fixed by setting the retaining device between the seat, consisting essentially of a seat back and seat part on the one hand, and the carrier part on the other hand. The vehicle seat according to the invention thus can be set in a comfortable sitting position individually within a wide range of its restrictive guides.

During a rear or frontal collision of the vehicle, a force acts on the seat via the body weight of the user, which leads to the seat back and/or the seat part moving in the restrictive guides from the individually selected starting position to a safety position. So that the seat can carry out this limited movement in a crash situation, the retaining device between the seat and the carrier part is constructed to be yielding and energy-absorbent to a certain defined extent. In this process, the retaining device can, for example, have a linkage acting between the seat and the carrier part, in which targeted bending positions or the like are provided. Thus, the seat according to the invention is distinguished by the greatest degree of seating comfort and the highest degree of safety possible.

In order to be able to transfer the pelvis movement to the seat back and to be able to parry the whiplash movement of the head during a rear collision, it is advantageous if the area of the seat back which faces the user, between its restrictive guide and its lower end area, and/or in the area of the headrest, is constructed with a comparatively low flexibility. In contrast, a preferred embodiment form according to the invention provides that the upholstery of the seat back approximately in the chest area of the user is constructed soft in comparison to the pelvis area.

A soft upholstering in the chest area provides that the support of back, neck, and head is effected simultaneously to a large extent. In particular, a zone upholstering with three zones is created, namely a 1st zone: pelvis with hard upholstery; a 2nd zone: thoracic vertebra with soft upholstery; and a 3rd zone: head with hard upholstery. In case of a rear collision, this upholstery design supports the sequentially correct introduction of forces into the shell of the seat back, and as already mentioned, provides for as simultaneous a support of the spine as possible, in particular in the upper area. Moreover, a forward-tending movement or at least a stationary behavior of the headrest is caused at the beginning.

It is advantageous if the arrangement of the seat back-restrictive guide on the carrier part and/or the upholstering of the seat back and/or the rigidity of the seat back are respectively dimensioned for an initial behavior of the seat back at least with position retention of the headrest in a catching position for the head, preferably for a forward movement, as well as for a subsequent back movement into a support position. The seat back-restrictive guide should thus be arranged at a distance above the linkage axis provided between the seat back and the seat part, preferably above the pelvis of the seat user, so that the fallback movement of the pelvis during a rear collision opposes the subsequent return movement of the head, at least in the sense of a position retention of the headrest. It is especially advantageous, however, if the arrangement of the seat back-retention guide is selected such that the return movement of the pelvis is converted into a forward movement of the headrest, which supports the head of the user at an early time, and if this forward movement subsequently follows a return movement of the seat back, such that the stresses are reduced on the neck and the head.

This movement progression of the seat back from its starting position to a safety position is supported by the above-described upholstering of the seat back, which has a comparatively low degree of flexibility in the pelvis and head area of the user and, in contrast to that, should be softer in the chest area. For the desired initial behavior of the seat back, it must be constructed to be sufficiently rigid and load-bearing.

An optimization of the ergonomics, on the one hand, and the crash behavior for rear collisions, on the other hand, is favored if the restrictive guide of the seat back runs approximately in a straight line in the longitudinal direction of the seat back.

In order also to be able to raise the front edge of the sitting surface sufficiently steeply over a comparatively short movement distance in the restrictive guide, it is advantageous if the restrictive guide of the seat part runs on a curve with a radius of curvature approximately conforming to the hip joint of the user.

In order to give the seat back as well as the seat part a sufficient stability, it is advantageous if the seat back and the seat part have a back shell and a seating shell, respectively, and if the headrest is preferably an integral component of the back shell.

A preferred embodiment according to the invention provides that the seat back and the seat part are pivotably connected together at their ends which face each other, that the seat back and the seat part are held in their restrictive guides on the carrier part at a distance from their mutual free floating pivot axis, and that the restrictive guide of the seat back and/or the seat part are constructed as rotating sliding guides.

Additional embodiments of the invention are described below and in the dependent claims.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
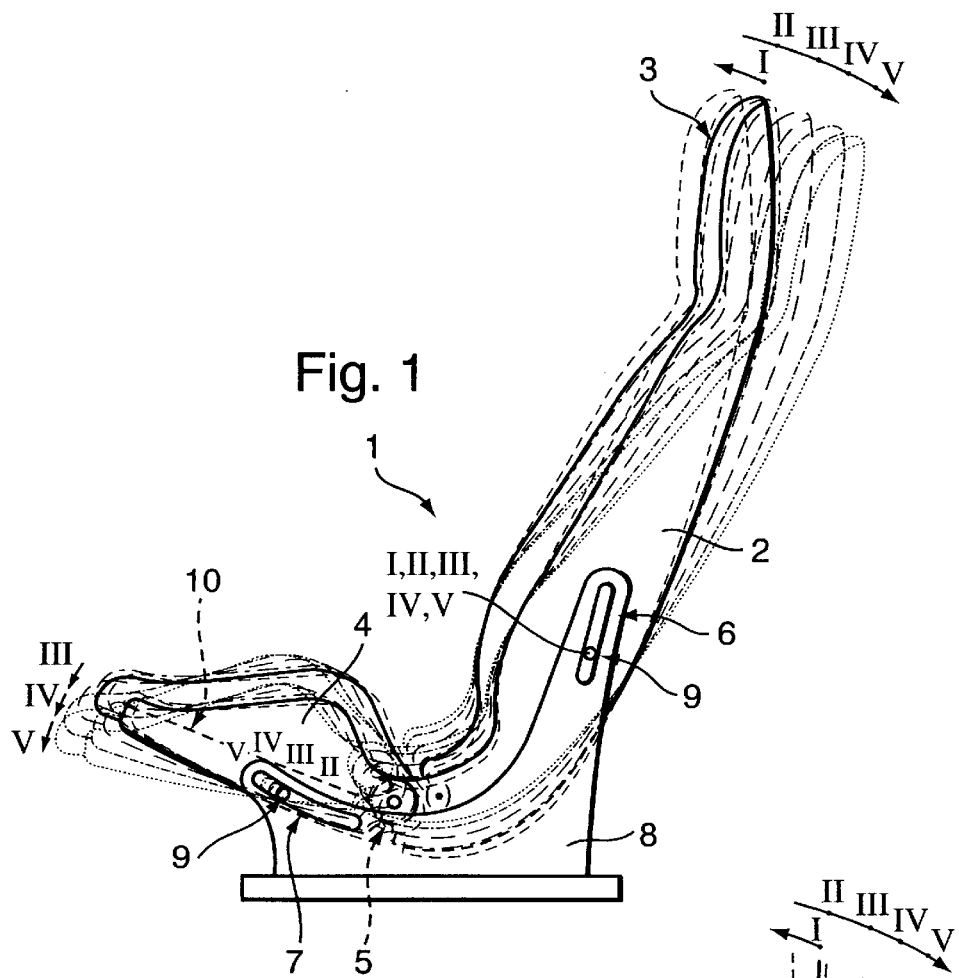
FIG. 1 shows a vehicle seat, which has a seat back as well as a seat part connected to it in a hinged manner, which are each held in a restrictive guide on a support part, wherein the progression of movement in the case of a rear collision is depicted in dotted lines I–V.
Figure 3:
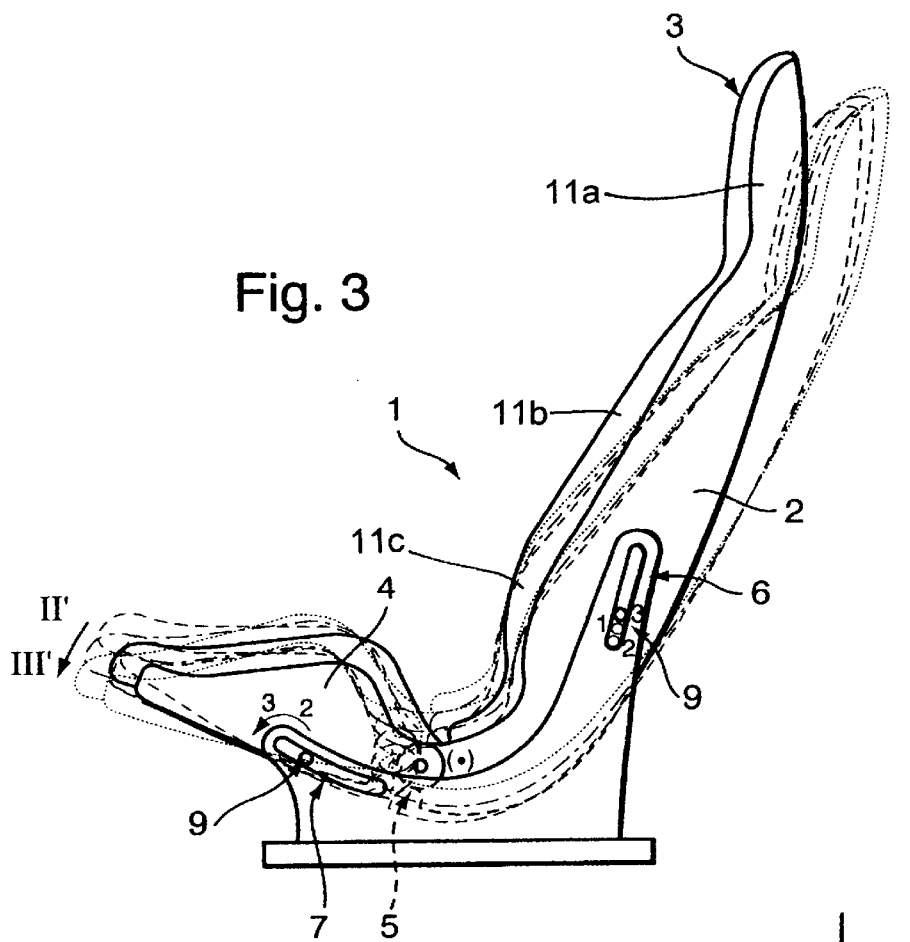
FIG. 3 shows the vehicle seat of FIG. 1, wherein the movement progression in the case of a frontal collision is depicted in dotted lines.

In FIGS. 1 and 3, a vehicle seat 1 is depicted which has a seat back 2 with integrated (unitary) headrest 3 as well as a seat part 4. The seat back 2 and the seat part 4 are connected together in a hinged manner at their end areas which face each other. At a distance from this common free-floating hinge axis 5, the seat back 2 and the seat part 4 are held respectively in restrictive guides 6, 7 on a carrier part 8. The carrier part is anchored on the vehicle floor.

So that the user can adjust the vehicle seat 1 continuously into a sitting position which is comfortable to him, the seat back 2 and seat part 4 are displaceably guided in the restrictive guides 6, 7 of the carrier part 8. In this process the selected adjustment position can be set by a retaining device 20 which is essentially located under the seat part 4.

Since the hinge axis 5, and thus the connection between the seat back 2 and the seat part 4 is independent from the carrier part 8 and can thus float freely, the vehicle seat 1 can be adapted to any desired sitting posture to fit the contours of the body.

As FIGS. 1 and 3 show, the hinge axis 5 between the seat back 2 and the seat part 4 is arranged at the point lying closest to the hip joint. Thus, the synchronized movement of the body and seat is optimized and the "pulling out the shirt" effect is minimized. Since the restrictive guide 7 of the seat part 4 is constructed as a rotating sliding guide, and since the seat part 4 is thus also mounted to rotate, an additional resiliency is effected.

The restrictive guides 6, 7 are affixed starting from the hip joint, and for this reason the vehicle seat 1 is practically automatically adapted to the body when the retaining device 20 between the seat and the carrier part 8 is released. By loosening the retaining device 20 and consciously taking the desired sitting posture, the user can determine thereby the position of the seat back 2 and seat part 4.

The vehicle seat 1 depicted here is distinguished not only by its distinctive ergonomics, but also offers the user the greatest possible degree of safety. In addition, the forces acting due to the body weight of the user during a rear or frontal collision of the vehicle are converted into a safety movement of the seat back 2 and/or the seat part 4, which can thereby slide in their restrictive guides 6, 7 from the originally selected starting position into a safety position. So that the seat, which essentially consists of seat back 2 and seat part 4, can carry out this restricted movement in a crash situation, the retaining device 20 between the seat and the carrier part 8 is constructed to be flexible to a certain degree. For this purpose, the retaining device 20 can, for example, have a linkage acting between the seat part 4 and the carrier part 8, in which target bending positions are provided.

Figure 5:
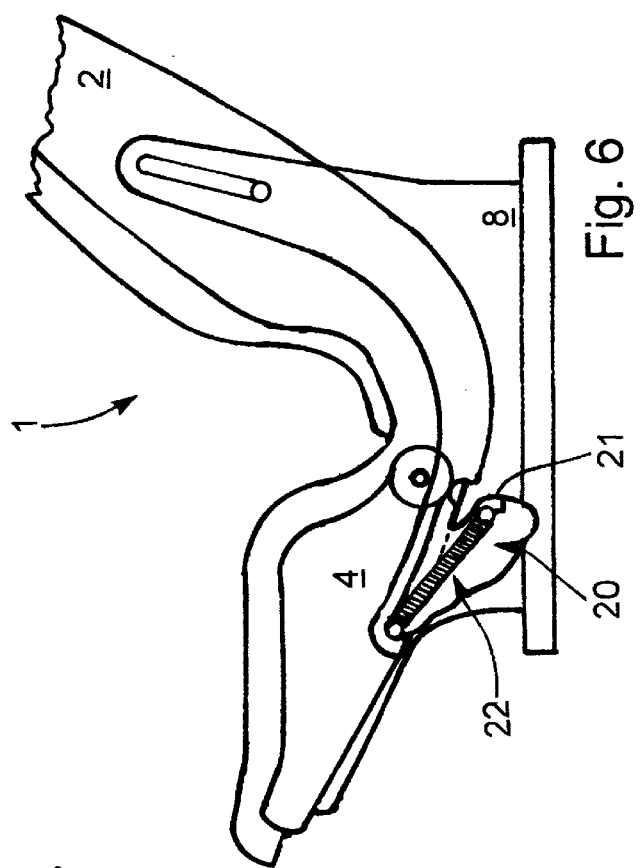
FIG. 5 shows the vehicle seat of FIGS. 1 and 3, partially broken away in the region of its retaining device operating by the determined seating position, wherein the seat is represented during a frontal crash and with its seat part moved forward in a slanted manner.
Figure 6:
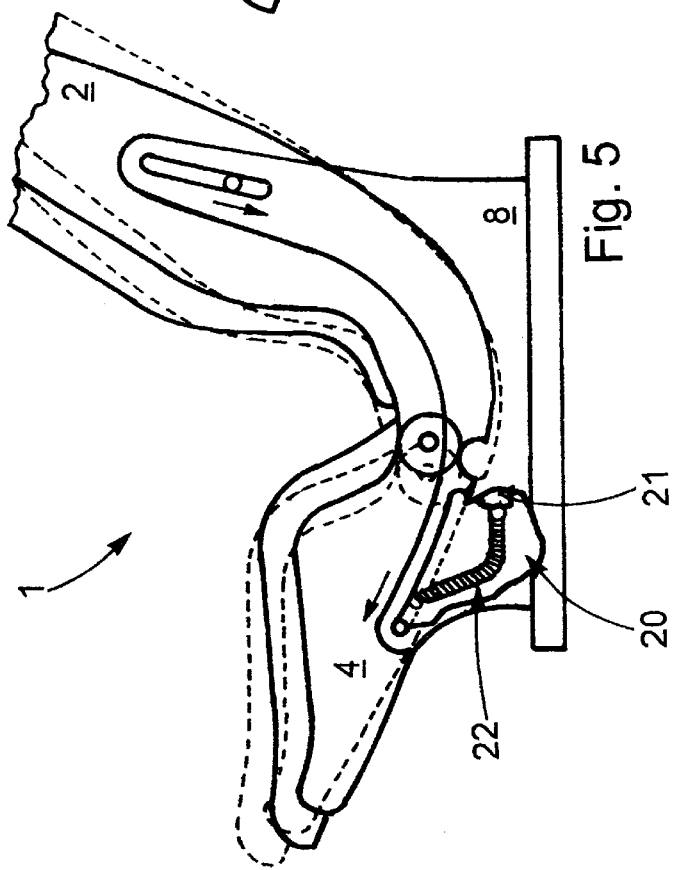
FIG. 6 shows the partially broken away vehicle seat of FIG. 5 in the safety position reached after a frontal crash.

In FIGS. 5 and 6, the vehicle seat 1 is shown, partially broken away in the region of its retaining device 20. The retaining device 20 has a gas pressure spring 21 (only partially shown), which with its one attachment end is connected to the seat part 4 of the vehicle seat 1 by means of a connection arm 22, here somewhat L-shaped. While the gas pressure spring 21, constructed as a fixing or locking element, engages the connecting arm 22 with its one attachment end, the other attachment end (not shown here) is held immovable on the carrier part 8. Upon adjustment of the vehicle seat 1 to a desired position, the gas pressure spring 21 is released, in order subsequently to be able to close it again for fixation of the desired seating position, and arrested in the appropriate relative position between the cylinder and the piston rod of the gas pressure spring 21.

In FIG. 5 and 6, the vehicle seat 1 is shown during (see FIG. 5) and after (see FIG. 6) a frontal collision. As is apparent from a comparison of FIGS. 5 and 6, the retaining device 20, operating by the determined seating position, is configured as energy absorbingly yielding during the frontal crash. The approximately L-shaped connecting arm 22 thereof is deformed during the crash-induced introduction of forces through the user of the vehicle seat, such as to the elongated form shown in FIG. 6, so that the vehicle seat 1 moves from the starting position shown by the continuous lines in FIG. 5 to the safety position illustrated in FIG. 6.

As is clear from FIG. 1, the restrictive guide 6 allocated to the seat back 2 is arranged far above the common hinge axis 5 and corresponding sitting surface 10. In case of a rear collision, the seat back 2 is supported in an area of its restrictive guide 6 at such a distance from the location of the pelvis area of the user, where forces are introduced into the seat back, that a correspondingly effective lever arm is created.

Figure 2:
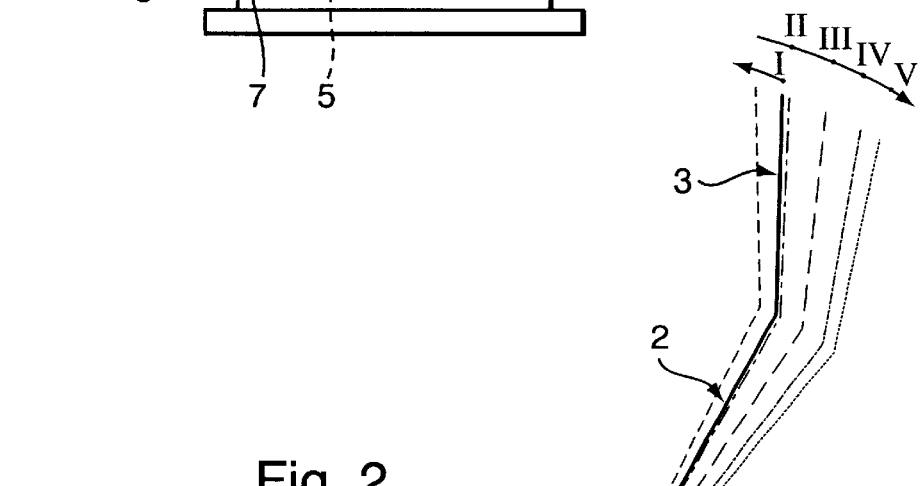
FIG. 2 shows schematically the movement progression of the seat back and the seat part of the vehicle seat of FIG. 1 in the case of a rear collision.

In FIGS. 1 and 2 reference numeral I indicates that by the pelvis of the user acting on the seat back 2 during a rear collision, at first an initial uprighting of the seat back 2 occurs, which intercepts, at an early point in time, the head of the user which is moving rearwardly relative to the seat, by means of the headrest 3 which is coming slightly forward.

According to the reference numerals II to V in FIG. 1 and 2, the upper part of the seat back 2 subsequently carries out a relative rearward movement, whereby the stresses on the neck and head of the user are reduced. In this process, the seat back 2 turns around its upper axis 9 guided in the restrictive guide 6, while the seat part 4 moves forward. In the end safety position according to reference numeral V, the translation of the seat part 4, may be completed when it reaches the front stop in the restrictive guide 7, whereby the seat part 4 is slightly rotated in the horizontal, and the seat back 2 is raised in its restrictive guide 6.

This sequence of movement progression according to FIGS. 1 and 2 causes, in the case of a rear collision, an improved support in the cervical vertebra area and correspondingly reduces the danger of a whiplash trauma.

While the seat back 2 should be upholstered with upholstering 11a, 11b, 11c so that it is as hard as possible in the pelvis area 11c as well as in the area of the headrest upholstering 11a in order to be able to effectively transfer the energy to the seat back 2, a soft upholstering 11b of the seat back 2 is provided in the chest area of the user. A preferably adjustable neck upholstery, which is not shown here, functions to ensure a constant distance between the contour of the upper spinal area and the contour of the supporting back upholstery. The upper vertebrae should thereby be simultaneously and uniformly supported in a rear collision, which also acts against the danger of a whiplash trauma.

Figure 4:
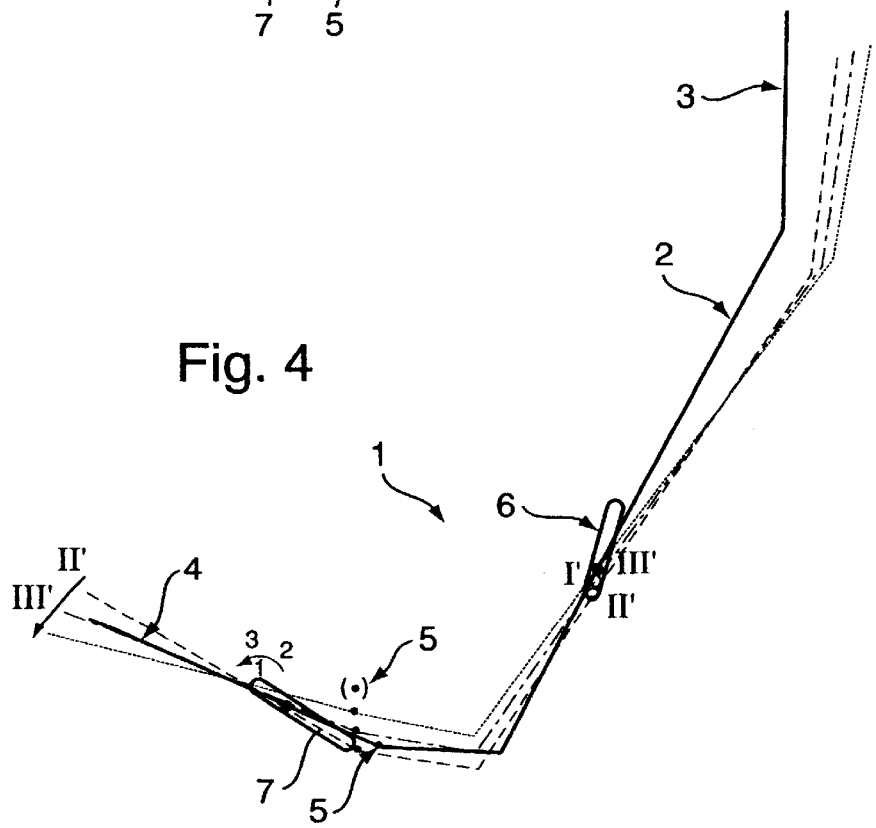
FIG. 4 shows schematically the movement progression of the seat back and the seat part of the vehicle seat of FIGS. 1 and 3 in the case of a frontal collision.

While the restrictive guide 6 of the seat back 2 runs approximately straight in the longitudinal direction of the seat back 2, the restrictive guide 7 of the seat part 4 is oriented both forwardly and upwardly in the direction facing away from the seat back 2. As shown in FIGS. 3 and 4, the seat part 4 can thus, as a result of the body weight of the user which acts towards the front, move from the selected starting position into a safety position during a frontal collision. For this safety movement of the seat part 4, likewise directed towards the front, the retaining device is here also constructed to be flexible between the seat and the carrier part 8.

As shown in FIGS. 3 and 4, the seat part 4 and the seat back 2 move as a seating unit during a frontal collision, at first forwardly in their restrictive guides, which is associated with a rise of the entire sitting surface of the seat part 4 corresponding to the guide path of the restrictive guide 7. In this way, on the one hand, the stresses on the pelvis are reduced, and on the other hand, a submarining is prevented. After reaching the respective guide stops, the seat part 4 can, according to the reference numerals II' and III', turn slightly, while the seat back 2 moves slightly upwardly.

The movement progression of the vehicle seat 1 shown in FIGS. 3 and 4 prevents the user from submerging under the seat belt during a frontal collision. In order to prevent this, the vehicle seat 1 has the restrictive guide 7 for the seat part 4, oriented upwardly in the direction facing away from the seat back 2. During a frontal collision, in which the driver is projected forwardly, the seat part 4 can thus also move forwardly and upwardly along its restrictive guide. By the position of the seat part 4 bending increasingly toward the front during the frontal collision, the user is prevented from submerging under the belt. In this process, the simultaneous movement of the seat back 2 shown in FIGS. 3 and 4 is practically not used, because the user is projected forwardly anyway with his upper body in a frontal collision.

In order to transfer the forward-oriented catapulting movement of the user to the seat part 4, the seat part has, in the area of the front edge of its sitting area, an upholstered projection or a gradation, which transfers the forwardly-directed projected movement of the pelvis to the seat part 4.

The seat back 2 and the seat part 4 of the vehicle seat 1 are constructed here as back and seat shells. In this way, the headrest 3 is an integral (unitary) component of the back shell 2. The restrictive guides 6, 7 allocated to the seat back 2 and the seat part 4 are constructed as rotating slide guides. On the seat back 2 as well as the seat part 4, guide cams 9 are provided for this purpose, preferably on both sides, which are movably guided in the corresponding guide paths in the carrier part 8.

In the Figures presented above, the elasticity of the seat and back shells was not considered. For drawing-geometry reasons, the rotational movement is depicted in each case in an exaggerated manner, since the elasticity of the seat back 2 could not be properly illustrated, and the hinge axis 5 has thus moved too sharply upwardly.

The vehicle seat 1 shown here offers the user the highest possible degree of comfort, and is furthermore distinguished by a high degree of safety in rear and frontal collisions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A vehicle seat (1) comprising a carrier part (8) which is adapted to be mounted to a vehicle, a seat back (2), and a seat part (4) having a sitting surface, the seat back (2) and the seat part (4) being hingedly connected to each other by a pivot point (5) between their adjacent ends, wherein the carrier part (8) adjustably supports the seat back (2) and the seat part (4) at connection positions in a form of restrictive slide guides (6, 7) for movably conducting the seat back (2) and the seat part (4), such that the seat back (2) and seat part (4) can be adjusted to and fixed in a starting position selectable by a user of the vehicle seat (1), and the seat back (2) is movable from the starting position to a safety position by a crash-related introduction of force through the user during a rear collision, and wherein the carrier part (8) has a support for the seat back (2) arranged at a distance above the sitting surface, such that a lower portion of the seat back (2) between the support and the pivot point (5) acts as a lever arm, wherein introduction of forces from a pelvis area of the user against the seat back (2) during the rear collision causes the lever arm to move the seat part (4) and an upper part of the seat back (2) above the support to the safety position.

2. The vehicle seat according to claim 1, wherein the seat back (2) has an integral headrest (3).

3. The vehicle seat according to claim 2, wherein an area of seat back (2) which faces the user is constructed with a low flexibility material in the lower portion acting as a lever arm and in an area of the headrest (3).

4. The vehicle seat according to claim 1, wherein an upholstering of the seat back (2) is constructed to be soft approximately in an upper portion of the seat back (2) corresponding to a chest area of the user in comparison to the lower portion of the seat back (2) corresponding to the pelvis area of the user.

5. The vehicle seat according to claim 1, further comprising a retaining device (20) attached to the carrier part (8) and adapted to fix the seat back (2) and the seat part (4) in different adjustment positions, wherein the retaining device (20) is effective between the seat part (4) and the carrier part (8) for a fixed sitting position and is flexible in an energy-absorbent manner for movement of the vehicle seat (1) from the starting position to the safety position during a crash-related introduction of forces.

6. The vehicle seat according to claim 1, wherein the connection position of the restrictive slide guide (6) supporting the seat back (2) on the carrier part (8) provides an initial behavior of the seat back (2) at least with respect to a position of a headrest (3) for a forward movement of the headrest to a catching position for a head of the user during a rear collision as well as a subsequent backward movement of the headrest (3) into a support position.

7. The vehicle seat according to claim 1, wherein the restrictive slide guide (6) of the seat back (2) extends approximately straight in a longitudinal direction of the seat back (2).

8. The vehicle seat according to claim 1, wherein the restrictive slide guide (7) of the seat part (4) extends on a curve with a radius of curvature adapted to conform approximately to a curvature of a hip joint of the user.

9. The vehicle seat according to claim 1, wherein the seat back (2) and the seat part (4) have respectively a back shell and a sitting shell, and a headrest (3) is an integrated component of the back shell.

10. The vehicle seat according to claim 1, wherein the restrictive guides (6, 7) are located on the carrier part (8) and support the seat back (2) and the seat part (4) at respective distances from the pivot point (5) which forms a free-floating hinge axis, and wherein the restrictive guides (6, 7) of the vehicle seat are constructed as rotating slide guides.

11. A vehicle seat comprising a carrier part (8) which is adapted to be mounted to a vehicle, a seat back (2), and a seat part (4) having a sitting surface, the seat back (2) and the seat part (4) being hingedly connected to each other by a pivot point (5) between their adjacent ends, wherein the carrier part (8) adjustably supports the seat back (2) and the seat part (4) at connection positions in a form of restrictive slide guides (6, 7) for movably conducting the seat back (2) and the seat part (4), such that the seat back (2) and seat part (4) can be adjusted to and fixed in a starting position selectable by a user of the vehicle seat (1), and the seat part (4) is movable from the starting position to a safety position by a crash-related introduction of force through the user during a frontal collision, wherein the carrier part (8) supports the seat part (4) by one of said slide guides, (7) oriented on a slant forwardly away from the seat back (2), and wherein the carrier part (8) has a support for the seat back (2) arranged at a distance above the sitting surface, such that a lower portion of the seat back (2) between the support and the pivot point (5) acts as a lever arm wherein introduction of forces from a pelvis area of the user against the seat back (2) during the frontal collision causes the lever arm to move the seat part (4) and an upper part of the seat back (2) above the support to the safety position.

12. The vehicle seat according to claim 11, wherein the seat back (2) has an integral headrest (3).

13. The vehicle seat according to claim 12, wherein an area of seat back (2) which faces the user is constructed with a low flexibility material in the lower portion acting as a lever arm and in an area of the headrest (3).

14. The vehicle seat according to claim 11, wherein an upholstering of the seat back (2) is constructed to be soft approximately in an upper portion of the seat back (2) corresponding to a chest area of the user in comparison to the lower portion of the seat back (2) corresponding to the pelvis area of the user.

15. The vehicle seat according to claim 11, further comprising a retaining device (20) attached to the support carrier (8) and adapted to fix the seat back (2) and the seat part (4) in different adjustment positions, wherein the retaining device (20) is effective between the seat part (4) and the carrier part (8) for a fixed sitting position and is flexible in an energy-absorbent manner for movement of the vehicle seat (1) from the starting position to the safety position during a crash-related introduction of forces.

16. The vehicle seat according to claim 15, wherein the retaining device (20) comprises a gas pressure spring (21) connected to the seat part (4) by an energy absorbingly yielding connecting arm (22).

17. The vehicle seat according to claim 11, wherein the connection position of the restrictive slide guide (6) supporting the seat back (2) on the carrier part (8) provides an initial behavior of the seat back (2) at least with respect to a position of a headrest (3) for a forward movement of the headrest to a catching position for a head of the user during a rear collision as well as a subsequent backward movement of the headrest (3) into a support position.

18. The vehicle seat according to claim 11, wherein the restrictive slide guide (6) of the seat back (2) extends approximately straight in a longitudinal direction of the seat back (2).

19. The vehicle seat according to claim 11, wherein the restrictive slide guide (7) of the seat part (4) extends on a curve with a radius of curvature adapted to conform approximately to a curvature of a hip joint of the user.

20. The vehicle seat according to claim 11, wherein the seat back (2) and the seat part (4) have respectively a back shell and a sitting shell, and a headrest (3) is an integrated component of the back shell.

21. The vehicle seat according to claim 11, wherein the restrictive guides (6, 7) are located on the carrier part (8) and support the seat back (2) and the seat part (4) at respective distances from the pivot point (5) which forms a free-floating hinge axis, and wherein the restrictive guides (6, 7) of the vehicle seat are constructed as rotating slide guides.

* * * * *